R. COBB.
Hay-Rack.

No. 36,604. Patented Oct. 7, 1862.

Witnesses.
J. W. Coombs
G. W. Reed

Inventor:
Russell Cobb
per Munn & Co
Attorneys.

UNITED STATES PATENT OFFICE.

RUSSELL COBB, OF HADLEY, MICHIGAN.

IMPROVED HAY AND GRAIN RACK.

Specification forming part of Letters Patent No. 36,604, dated October 7, 1862.

*To all whom it may concern:*

Be it known that I, RUSSELL COBB, of Hadley, in the county of Lapeer and State of Michigan, have invented a new and Improved Hay and Grain Rack; and I do hereby declare that the following is a full, clear, and exact description of the same, reference being had to the accompanying drawings, making a part of this specification, in which—

Figure 1:
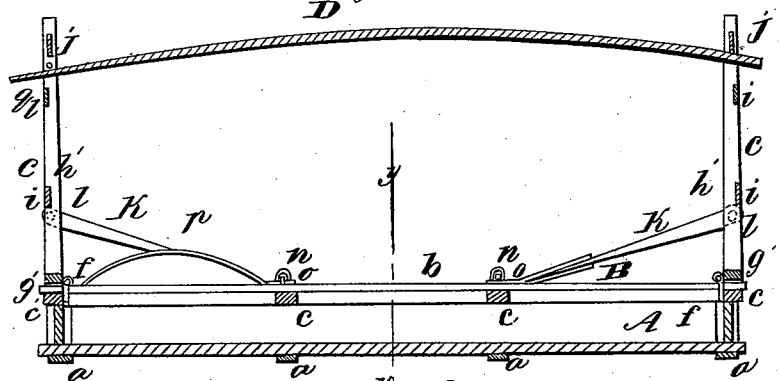
Figure 2:
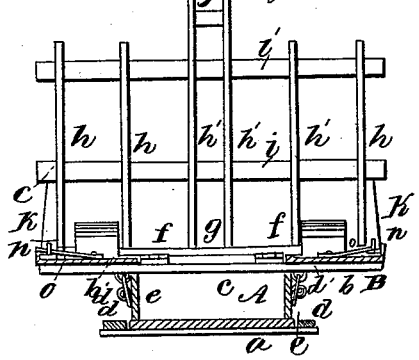
Figure 3:
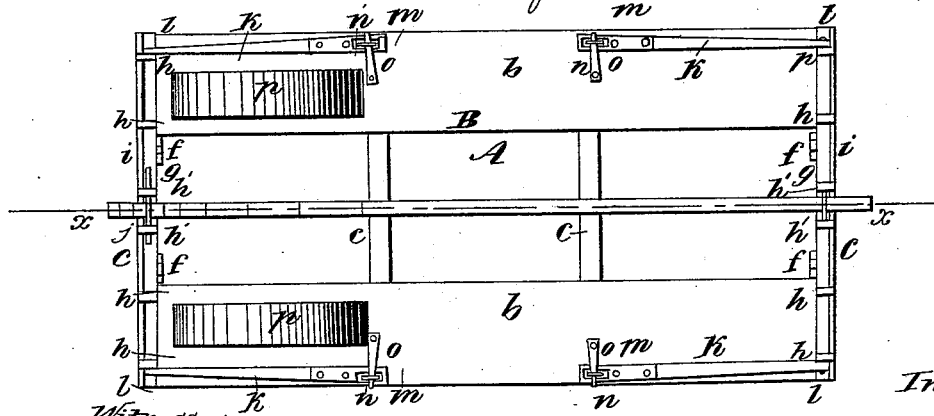

Figure 1 is a side sectional view of my invention, taken in the line $x\ x$, Fig. 3; Fig. 2, a transverse vertical section of the same, taken in the line $y\ y$, Fig. 1; Fig. 3, a plan or top view of the same.

Similar letters of reference indicate corresponding parts in the several figures.

This invention relates to a new and improved hay and grain rack designed to be placed on wagons, in order to facilitate the loading of the same, and to form a proper base to receive the load, so that a requisite amount can be placed on the wagon and properly adjusted or disposed thereon, the invention at the same time preventing the waste of grain when the latter article is being loaded on a wagon, and also insuring the hay or grain being retained in proper position.

To enable those skilled in the art to fully understand and construct my invention, I will proceed to describe it.

A represents a rectangular box, which may be constructed of pine or other lumber, properly braced by cross-pieces $a$, so as to render it strong and durable. This box forms what may be termed the "body" of the rack, serving to catch and retain all loose grain that may fall from the heads of the straw when grain is being loaded on the device.

B represents a platform constructed of two boards, $b\ b$, which are attached to the ends of transverse bars $c$, four in number, placed at about equal distances apart. The boards $b\ b$ are equal in length to the box A, and extend horizontally outward from the upper edges of the sides of the box A. (See particularly Fig. 2.) This platform is secured to the box A by hasps $d$, which are attached to the under sides of the two central transverse bars, $c\ c$, and fit on staples $d'$, at each side of the box A, through which keys $e$ pass. (See Fig. 2.)

To each end of transverse bar $c$ of the platform B there is attached, by hinges $f\ f$, a bar, $g$, the hinges $f$ being attached to the end of the transverse bars $c$ between the boards $b\ b$, as shown in Fig. 3. To each bar $g$ there is attached a series of (six) uprights, $h$, which are connected by cross-bars $i$, forming end frames, C, for the rack. These end frames may be of any desired height, and they are equal in width to the platform B. The two central uprights of each frame C (designated by $h'$) are higher or longer than the others, and they are connected by transverse bars $j$ near their outer ends. These frames C C, when the device is in use, are retained in an upright position by braces $k$, which are attached to the sides of the frames C by pivots $l$, and have eyes or slots $m$ in their inner ends, which fit on staples $n$ in the boards $b\ b$, through which staple-keys $o$ pass. (See Figs. 1 and 3.

When the device is not in use, the frames C, by releasing the inner ends of the braces from the boards $b\ b$, may be folded down upon the platform, and the device thereby rendered very compact, so that it may be stowed away in a small compass. The back parts of the boards $b\ b$ of the platform B are provided with holes, over which caps or guards $p\ p$ are secured. These holes receive the upper parts of the back wheels of the vehicle on which the rack is placed.

In loading grain it is designed to place the heads of the bundles inward, so that the box A will catch all the loose grain. The load is bound in the rack by means of a binder or pole, D, (see Fig. 1,) one end of which is fitted under the transverse bar $j$ of the central uprights, $h$, of the back frame, C, by a pin, $q$.

The advantages of this invention are as follows: It is constructed all of straight stuff, and therefore may be made by almost any one familiar with tools at a very moderate cost. It can be very readily applied to and removed from the vehicle, and the platform B can be detached from the box A, so that the latter may be used separately for other purposes, if desired. By its use the vehicle may be properly loaded and balanced by almost any one without difficulty, and the load will be firmly secured on the vehicle; and when grain is the article to be carried all the loose grain, now mostly lost, will be saved, it being caught by the box A.

Having thus described my invention, what I claim as new, and desire to secure by Letters Patent, is—

The box A, in combination with the platform B and folding frames C C, all constructed and arranged, substantially as shown, to form a new and improved hay and grain rack for vehicles, as set forth.

RUSSELL COBB.

Witnesses:
 A. I. GREEN,
 ALVAH BENTLEY.